US006269460B1

(12) United States Patent
Snover

(10) Patent No.: US 6,269,460 B1
(45) Date of Patent: Jul. 31, 2001

(54) DYNAMIC ENHANCEMENT OF ERROR CONDITION HANDLING AND DISPLAYED ERROR MESSAGES IN COMPUTER OPERATIONS

(75) Inventor: Jeffrey Phillip Snover, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/145,087

(22) Filed: Sep. 1, 1998

(51) Int. Cl.[7] .................................................. G06F 11/30
(52) U.S. Cl. .................................................. 714/48
(58) Field of Search ................... 714/48, 49, 4, 714/25, 26, 38, 45, 46, 47, 31, 37; 717/1, 4; 711/100, 104, 167, 171; 710/15

(56) References Cited

U.S. PATENT DOCUMENTS

| Re. 30,187 | * | 1/1980 | Hong et al. ............... 340/146.1 AL |
| 3,795,916 | * | 3/1974 | Wallace et al. ...................... 444/1 |
| 4,339,657 | * | 7/1982 | Larson et al. ................. 235/92 QC |
| 4,617,663 | | 10/1986 | Lake et al. ........................... 371/25 |
| 5,121,475 | * | 6/1992 | Child et al. ......................... 395/153 |
| 5,261,097 | | 11/1993 | Saxon ................................. 395/650 |
| 5,465,328 | * | 11/1995 | Dievendorff et al. .......... 395/182.13 |
| 5,511,164 | | 4/1996 | Brunmeier et al. ............. 395/186.06 |
| 5,566,336 | | 10/1996 | Futatsugi et al. ................. 395/700 |
| 5,590,330 | | 12/1996 | Coskun et al. ................... 395/704 |
| 5,627,958 | | 5/1997 | Potts et al. ........................ 395/336 |
| 5,657,438 | | 8/1997 | Wygodny et al. ................. 395/180 |
| 5,659,547 | | 8/1997 | Scarr et al. .................... 395/182.02 |
| 5,684,996 | | 11/1997 | Westerholm et al. ............ 395/712 |
| 5,715,386 | | 2/1998 | Fulton, III et al. ............ 395/183.14 |
| 5,724,273 | | 3/1998 | Desgrousilliers et al. .......... 364/580 |
| 5,802,299 | * | 9/1998 | Logan et al. .................. 395/200.48 |
| 5,896,494 | * | 4/1999 | Perugini et al. ............... 395/183.03 |
| 5,974,568 | * | 10/1999 | McQueen .............................. 714/38 |
| 6,000,046 | * | 12/1999 | Passmore .............................. 714/57 |
| 6,002,868 | * | 12/1999 | Jenkins et al. ....................... 395/701 |
| 6,049,798 | * | 4/2000 | Bishop et al. ........................ 707/10 |
| 6,052,525 | * | 4/2000 | Carison et al. ..................... 395/701 |

\* cited by examiner

Primary Examiner—Nadeem Iqbal
(74) Attorney, Agent, or Firm—Jeffrey S. LaBaw; Jerry B. Kraft

(57) ABSTRACT

A system is provided enabling the dynamic modification of error condition handling procedures and/or error message modification triggered by any of the set of basic error messages which are developed with and inherent in applications being executed on computers or computer networks. The system comprises means for basic detecting and handling of a basic set of error conditions, together with means for providing, on at least one display terminal, error messages relative to the detecting and handling means. The system also includes means for providing dynamic modifications in the basic handling of said error conditions during computer or network operations, means for recording data representative of the dynamic modifications, means responsive to the basic error messages for activating the dynamic modification means and means responsive to the activating means for searching said recorded data and augmenting said error messages with additional information relative to said modifications.

19 Claims, 6 Drawing Sheets

DYNAMIC ENHANCEMENT OF ERROR CONDITION HANDLING AND DISPLAYED ERROR MESSAGES IN COMPUTER OPERATIONS

CROSS-REFERENCE

Copending patent application "COMPOSITION OF ERROR MESSAGES BASED UPON NON-LOCAL CONTEXTUAL INFORMATION" (Ser. No. 09/177,032) having the same inventor and assignee as the present application.

TECHNICAL FIELD

The present invention relates to interactive computer controlled display systems for controlling computer and computer network operations, and particularly to user friendly interactive display interfaces that provide error message notification and error tracking in computer operations, which is particularly useful in computer networks.

BACKGROUND OF THE INVENTION

The 1990's decade has been marked by a technological revolution driven by the convergence of the data processing industry, the communications industry and the consumer electronics industry. This advance has been even further accelerated by the extensive consumer and business involvement in the Internet over the past few years. It seems as if virtually all aspects of human endeavor in the industrialized world will potentially involve human-computer interfaces; especially such interfaces to communication networks as the Internet. As a result of these profound changes, there is a need to make computer directed activities accessible to a substantial portion of the world's population which was computer illiterate or, at best, computer indifferent. In order for the vast computer supported marketplaces to continue and be commercially productive, it will be necessary for a large segment of computer indifferent consumers, workers and business people to be involved in computer interfaces. In addition, because of the vast amount of information potentially available through networks such as the Internet, there has been an increasing demand on the part of relatively sophisticated users for implementations which make display terminal access to the Internet less cluttered and confusing and, of course, easier to use.

Among the most disturbing and frustrating user interface information to be presented to the interactive user, particularly a novice or less sophisticated user, is the error message. When an error message is presented to the user, it is usually at a time when something in the operation has stopped working or something bad is ominously waiting to happen. Usually the information in the error message is quite limited and sometimes is presented in computer jargon, both of which may panic the unsophisticated user into a "What do I do now?" state of mind.

In this connection, we understand that the concept and presentation of an error message was developed at a time when the users of computers were a much smaller and more sophisticated group which was much more likely to know "What I do now". Developers of programs have, of course, recognized that their user base has expanded to a much larger and less sophisticated mass consumer base and have accordingly been working to make their error messages more comprehensive and informative. However, satisfying the error message needs of a wide variety of user groups in response to error conditions is a drain on the developers' resources and may be a virtual impossibility with programs having a broadly diverse group of potential users.

SUMMARY OF THE INVENTION

The present invention provides a solution to the above problems through a system for enhancing error messages in computer operations and computer network operations. The developers of any program to be used by computer users provide for a basic set of error conditions which the program may monitor for during normal computer operation using the program. The invention involves the basic combination of means for basic detecting and handling of the basic set of error conditions and means for providing a set of basic error messages respectively responsive to said basic set of error conditions. But the invention goes on to further provide means for recording data augmenting said basic error messages. In other words, the invention permits users of the program or those installing or setting up the program for less sophisticated users to set up message data to augment the basic error message in order to clarify the message or give more information about what the system is doing to fix the error condition which caused the error message. The key is that the additional information enhancing the error message is in response to, i.e. triggered by, the error message. Thus, the developer of the program need not have anticipated the enhanced information and the program is not affected by, nor has any affect on, the enhanced information. The enhanced information may be presented based primarily on the needs of the localized group of users of the program without changing the original program. In order to present the above-recorded information augmenting the error message, the system provides means responsive to the occurrence of an error message for searching for said recorded data and augmenting the error message with said recorded data.

The present invention operates most effectively when the programs are in scripted programming languages such as REXX (Restructured Extended Executor—a programming language used on International Business Machines Corporation (IBM) Mainframes and with OS/2, Version 2.0) and Perl (Practical Extraction Report Language) which is an interpreted language based on C and several Unix utilities. Perl is specifically designed to scan text files and extract and summarize information from these files. As such it is commonly used to create CGI (Common Gateway Interface) scripts that handle HTML (Hypertext Markup Language) outputs. Such scripted languages are simple to use and are easily converted to the text which is used to augment or supplement the error message output or displayed to the user. Also, such scripted languages are extensively familiar to developers and network users, particularly Internet functions; this is a major aspect of the present invention which will be developed hereinafter in greater detail.

Because the key to the present invention is that error handling and error message modifications are made in response to a set of basic error messages, such modifications may readily be made by programming support groups and even used after the basic program is "out the door" and in general usage. In addition to just modifying error messages to provide the users with more information, the invention provides for dynamic modifications in the basic handling of the error conditions during program operations; the means for activating these dynamic modifications are also responsive to the respective error messages.

Accordingly, the developer of the program tries to anticipate a group of error conditions which may occur in the operation of the program. He then may classify these error conditions into categories, each of which may be represented by a relatively broad error message. He then makes the program available to users and to systems support personnel. The support people, as well as the users of the program, then consider the skill and sophistication of the local users of the program to determine how much support such local users will need in dealing with error messages. With some local user groups, all that may be necessary is to give them some additional information about their options in dealing with certain error messages. In such a case, the invention provides for additional displayed information augmenting the basic error message. With other local groups, the level of computer sophistication may be so low that the computer system in place will have to automatically take steps to resolve the error conditions represented by the error message. In such a case, the invention provides for dynamic additions or modifications in the handling of an error condition in response to the error message. The key is that the modifications and/or augmented displayed data are both in response to the error message itself rather than to any particular error condition. Because both of these changes are triggered by the set of error messages rather than the actual error conditions, the changes may be made without changing anything in the programs. All the program developers have to do is put out the program with their set of basic error messages and then all modifications which users or support personnel choose to do locally may be triggered off one or more of the error messages.

This freedom to do dynamic local modifications in augmenting the error messages or in the actual error condition handling without changing the basic program has been particularly advantageous in programs distributed and used on networks such as the Internet, e.g. Internet browsers because of the wide spectrum of users of widely different skill levels at the display terminals at local nodes.

DETAILED DESCRIPTION OF THE PREFERRED EMBODIMENT

Figure 1:
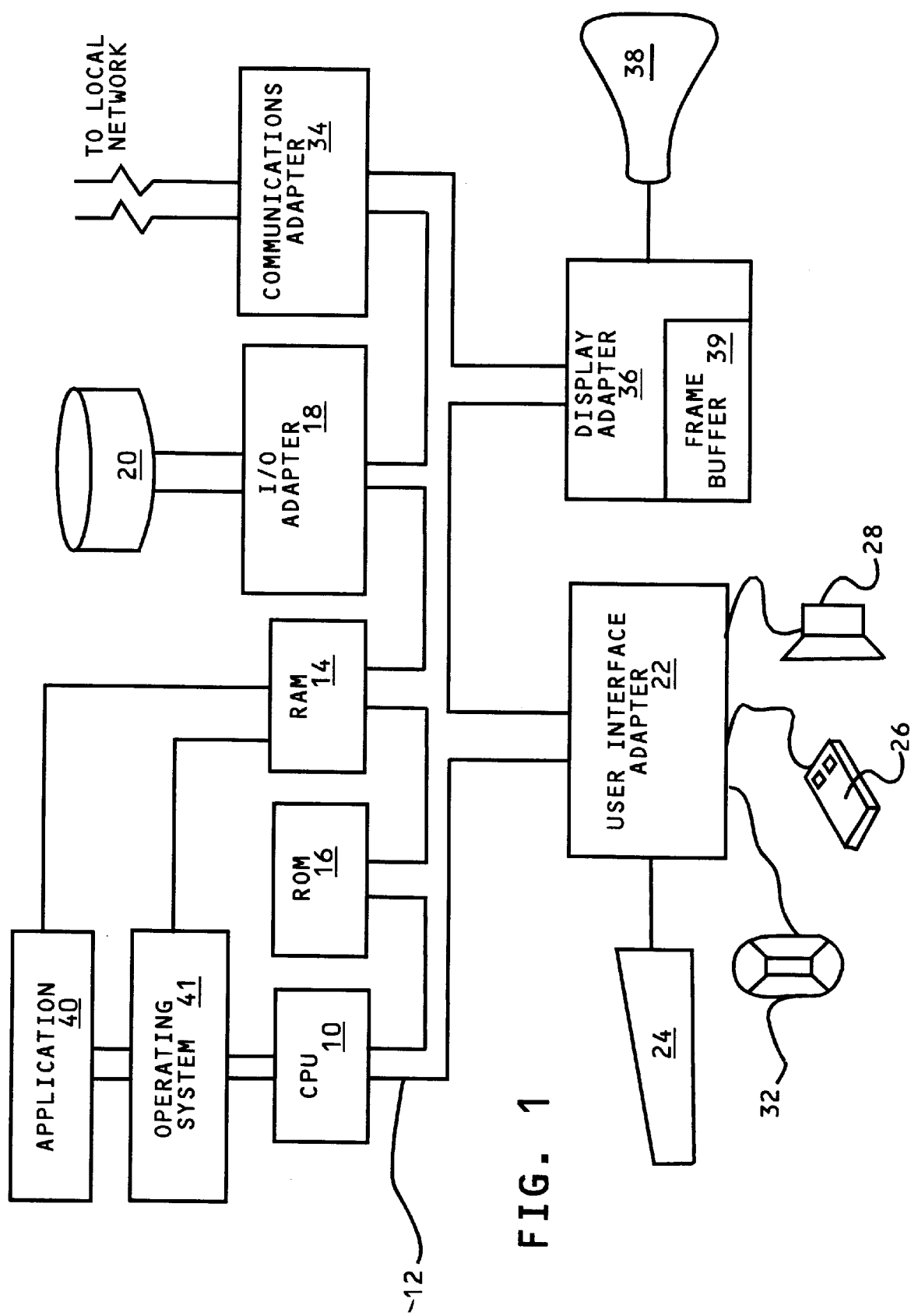
FIG. 1 is a block diagram of a data processing system including a central processing unit which is capable of implementing a local interactive display of the present invention.

Referring to FIG. 1, a typical data processing system is shown which may function as the local computer controlled display terminal used in implementing the system of the present invention by dynamically modifying the error condition handling and error message displaying in the computer operations being carried out under the control of the computer of FIG. 1. A central processing unit (CPU) 10, such as one of the PC microprocessors available from IBM, is provided and interconnected to various other components by system bus 12. An operating system 41 runs on CPU 10, provides control and is used to coordinate the function of the various components of FIG. 1. Operating system 41 may be one of the commercially available operating systems such as the OS/2(™) operating system available from IBM (OS/2 is a trademark of International Business Machines Corporation); Microsoft's Windows 95(™) or Windows NT(™), as well as UNIX or AIX operating systems. A program for enabling the modification of basic error conditions and the provision of supplemental displayed information in response to the occurrence of any of a set of basic error messages, application 40, to be subsequently described in detail, runs in conjunction with operating system 41 and provides output calls to the operating system 41 which implement the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN) or wide area network (WAN); which includes, of course, the Internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user may modify basic application programs having a fixed set of basic error messages to provide for specialized handling of error conditions and for additional displayed information augmenting basic error messages. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means through which the user will interface with the system.

In the implementation of the invention, it will frequently be the case that the programs having the basic set of error messages will be transmitted by or otherwise involve communication with other nodes within a network. The display terminal of FIG. 1 communicates with the network through the communications adapter 34. Since many of the aspects of the present invention involve access via networks, some background with respect to networks would be appropriate at this point. We will not go into great detail in describing the networks to which the present invention is applicable. U.S. Pat. Nos. 5,295,244, Dev et al., and U.S. Pat. No. 5,353,399, Kuwamoto et al., adequately detail conventional networks to which the present invention would be applicable, including appropriate network management and display terminal access to such networks. Reference has also been made to the applicability of the present invention to a global network such as the Internet. For details on Internet nodes, objects and links, reference is made to the text, "Mastering the Internet", G. H. Cady et al., published by Sybex Inc., Alameda, Calif., 1996.

Any data communication system which interconnects or links computer controlled systems or network elements at various sites or network nodes defines a communications network. A network may be as simple as two linked computers or it may be any combination of LANs or WANs. Of course, the Internet is a global network of a heterogeneous mix of computer technologies and operating systems. At each level in a network hierarchy, the unit may be considered as a local network unit at which the present invention may be implemented. For example, since the Internet connects networks of computers, a particular corporate network could be such a localized Internet element. Also, the particular LAN of each department in the corporate network could be a localized unit. At high levels, regional networks representative of cities could be considered to be the localized units to which this invention is applicable. Likewise, elements linked together by function to form localized networks characterized by functions as accounts receivable/payable or video-on-demand distribution.

Figure 2:
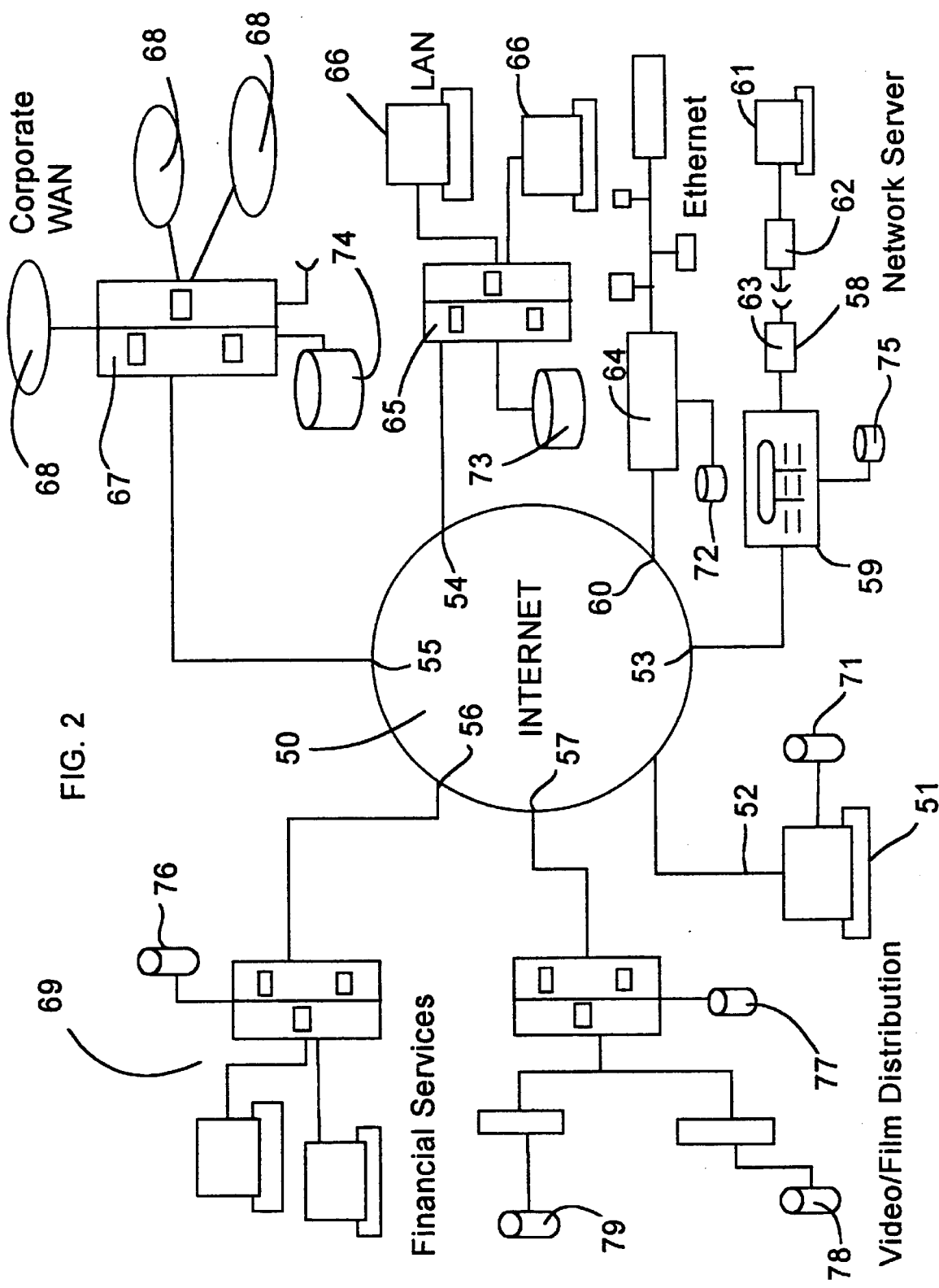
FIG. 2 is a generalized diagrammatic view of an Internet portion showing the local nodes in which the present invention may be implemented.

As a very general example of a network in which error messages from a variety of programs used in the network may be enhanced and error conditions modified in accordance with the present invention, reference is made to FIG. 2 which is a generalized diagram of a portion of the Internet to which the computer controlled display terminal 51 may be used, for example, to receive basic error messages pertinent to the operations controlled by computer terminal 51 and to modify the error conditions represented by such messages as well as to display additional data supplementing the error messages. Terminal 51 is the computer system shown in FIG. 1, and connection 52 (FIG. 2) is the network connection shown in FIG. 1. Some typical major elements connected to the Internet are user network 58 connected through server 59 at node 53. In such a server network, the individual users' workstations 61 are connected through telephone modems 62 and 63 to the server 59. Of course at the next level, each of the user workstations 61 may be considered as network elements. Among the other illustrative network elements are ethernet 64 at node 60 and a LAN at node 54 consisting of server 65 and workstation 66. At node 55, the connected element is a corporate WAN consisting of network server 67 and subnetworks 68. In addition, functional networks, such as financial services network 69 and video/film distribution network 70, may be considered as objects respectively connected at nodes 56 and 57. It should be noted that a variety of databases, 71 through 79, are shown respectively associated with network elements at various levels. These databases represent the various locations and repositories from which libraries may be accessed and data obtained, particularly in processes accessing a database or library.

Figure 3:
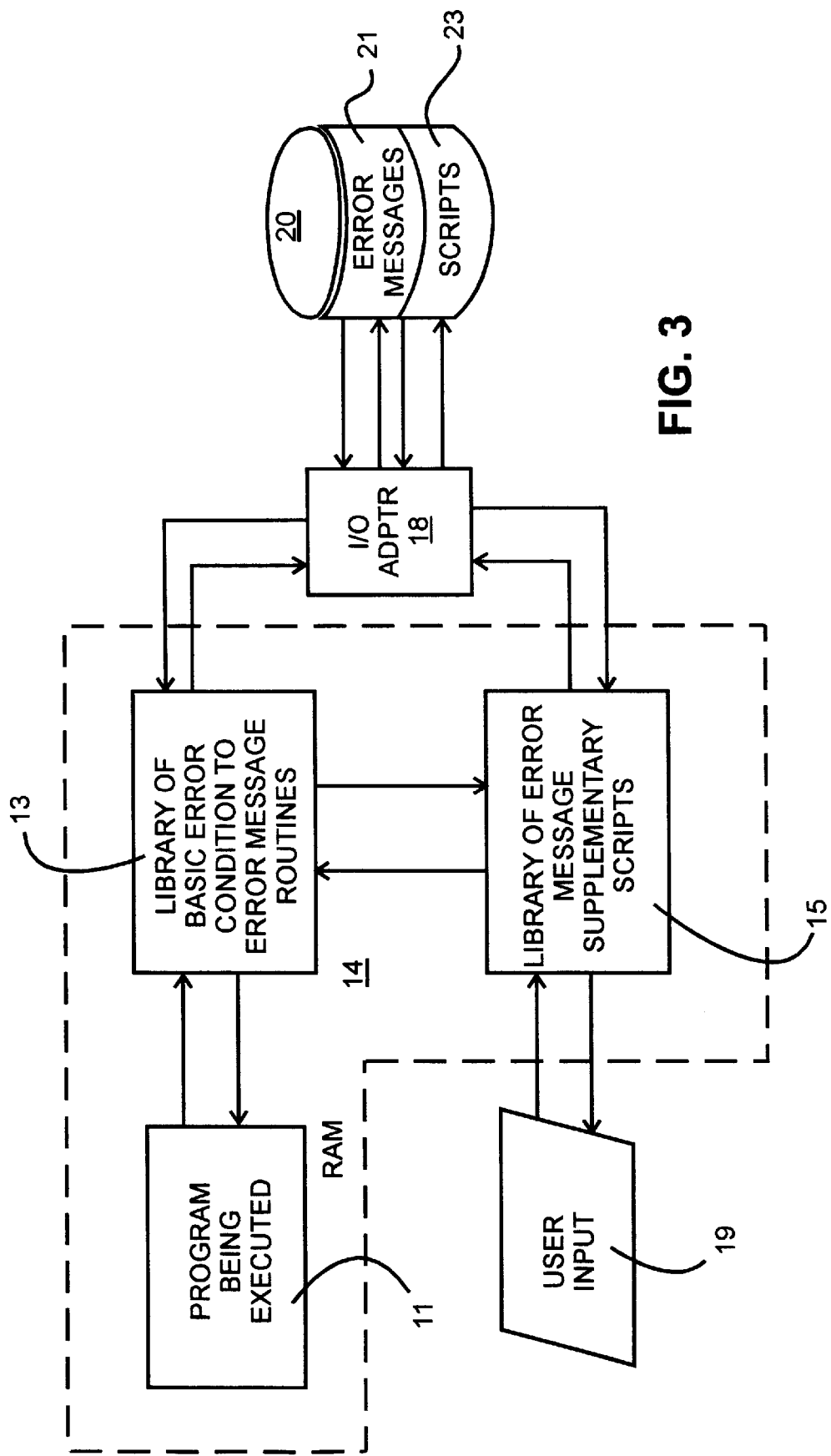
FIG. 3 is a block diagram of a system in a local computer display terminal for implementing the invention.

Referring now to FIG. 3, there will be described how the present invention may be implemented and the augmented or enhanced error messages displayed on the computer controlled display terminal, as shown in FIG. 1. The display terminal in FIG. 1 will be assumed to be a display terminal in a network. RAM 14 shown in FIG. 3 is the same RAM 14 of FIG. 1 illustratively expanded to show its contents. The program being executed will be a portion of a network browser program; it comes with a library 13 of its basic and predetermined error conditions, as well as appropriate library routines to display error messages resulting from the occurrence of basic error conditions. For purposes of this example, we assume that the program 11 is in a scripted programming language. When in response to an error condition library 13 produces an error message, the programmed operation of the present invention transmits the error message to a supplementary library 15 which contains a listing of scripts associated with the basic error messages. If such a script is found, then there is fetched from database 20, section 23, via I/O adapter 18, the appropriate script for action. The action will at least involve the display of data supplemental to the basic error message which an appropriate library 13 routine had obtained from database 20, section 21, via I/O adapter 18. Then, the basic error message and the supplemental data will be displayed on display 38, FIG. 1, after the error message, together with the supplemental data, is transmitted to display 38 via display adapter 36. As noted hereinabove, the script may also contain data modifying how the error condition represented by the message should be handled. This error condition handling information will be processed by the program of the present information. The user of the system, or anyone providing support to the system, may set up the modifications to error condition handling or data supplementing the error message through appropriate program script entries made via user I/O 19, FIG. 3, into the supplementary library 15 and eventually stored, in part, in section 23 of database 20. The point to note is that everything that is done is in response to a basic error message from the program being executed. Even where the error handling process is being modified for a particular error condition, the error condition itself does not trigger the modification. Rather, the error condition first triggers the error message which in turn triggers the modification action.

Following are some examples of how the system of the invention may respond to error messages. Assume a node to which data is to be sent on a network is not found and the following error message is generated: "Unknown node FOO.TIVOLI.COM". If an operator providing network support finds that this is a common error, he may enter script to augment the basic error message to add the following information: "Available nodes are: FOO.DEV.TIVOLI.COM and FOO1.TIVOLI.COM".

Assume the following error message: "Node FOO is unavailable". In this case, the operator supporting the system may feel that the user may need help in the handling of the error; so he enters script to modify the error handling and to generate the following information augmenting the error message and advising the user as to what was done: "Node FOO is unavailable—A MagicPacket was sent to wake up the node and it is now available. Please retry".

Alternatively, the error message that Node FOO was unavailable could result in the following error handling modification and error message augmentation: "Node Foo is unavailable. Attempts to wake up the node failed. The help desk was unaware of any problems with node Foo, so a trouble ticket (#1256343) was generated and sent to Joe Beggs (436-8953)".

Figure 4:
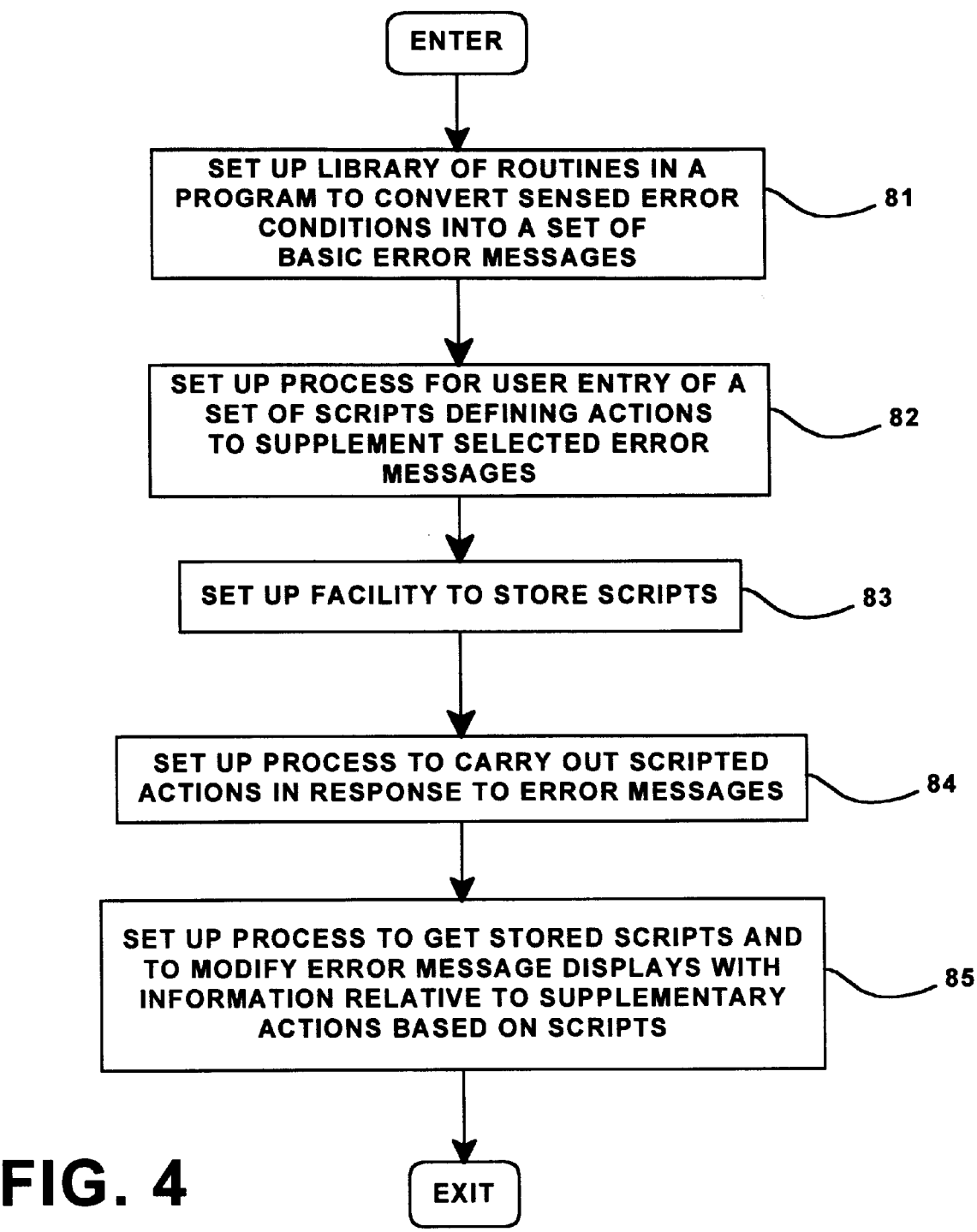
FIG. 4 is a flowchart of the basic elements of the program in the local display terminal for modification of the handling of error conditions and augmenting error messages.
Figure 5:
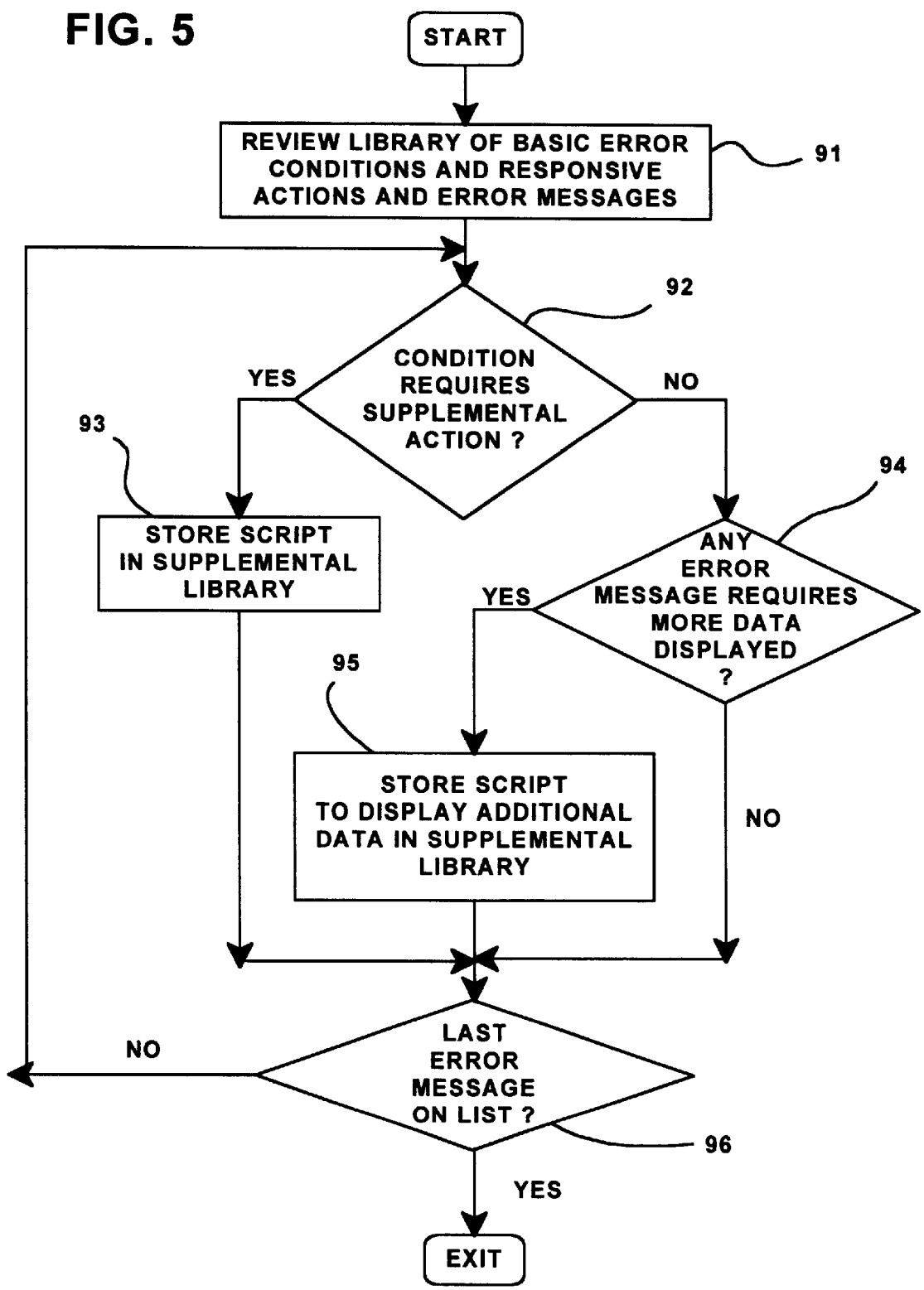
FIG. 5 is a flowchart of the steps involved in modifying the handling of error conditions and in augmenting error messages at a local display terminal.
Figure 6:
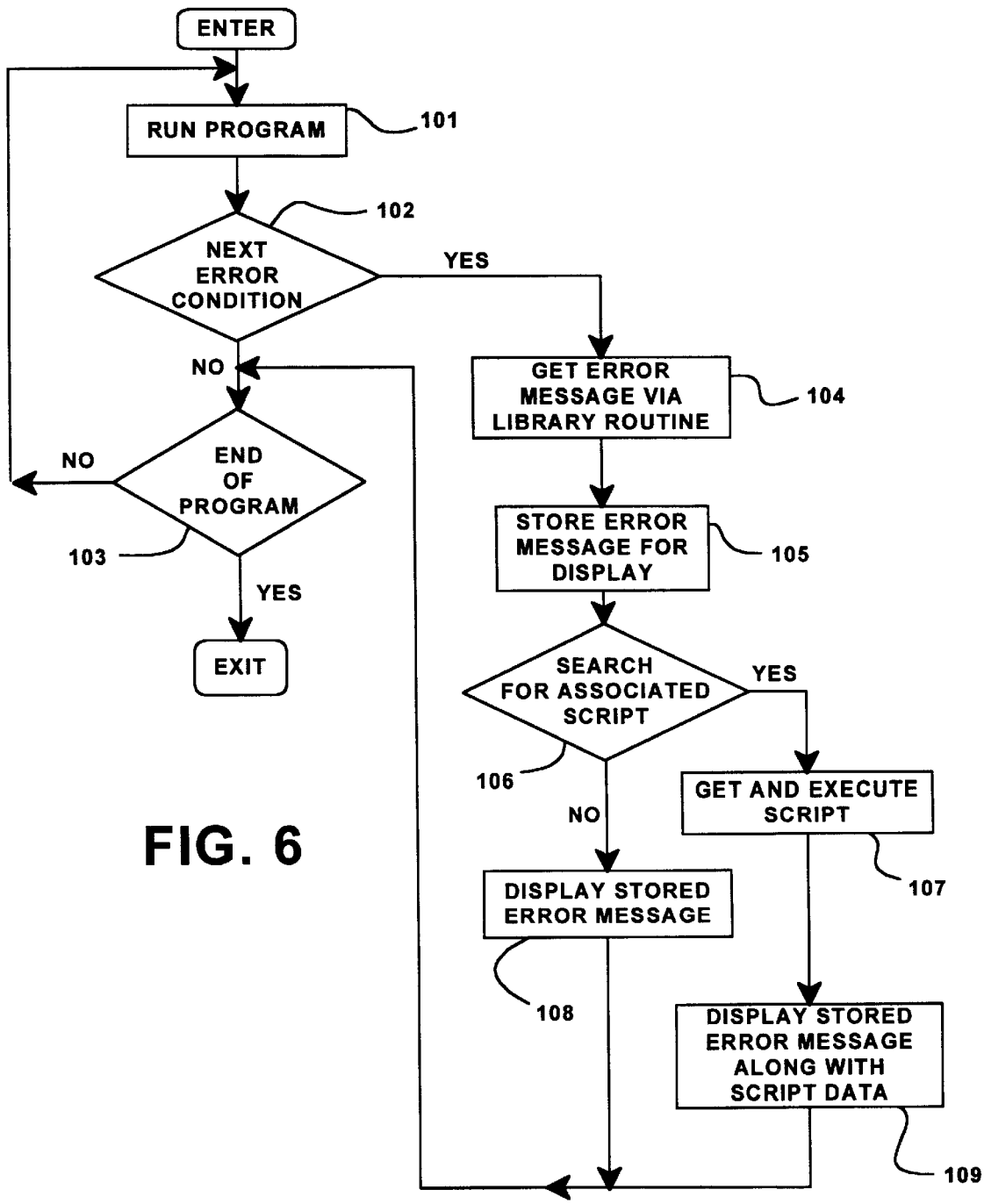
FIG. 6 is a flowchart of the steps involved in running the present program responsive to error messages.

Now, with reference to FIGS. 4, 5 and 6, we will describe a process implemented by the present invention in conjunction with the flowcharts of these figures. FIG. 4 is a flowchart showing the development of a display process according to the present invention for modifying error condition handling and augmenting basic error messages. First, step 81, a library of routines is set up in the program to be executed, library 13, FIG. 3, for converting detected error conditions into a set of basic error messages. This, the basic set of error messages, is inherent in any program to cover standard error conditions. Then, step 82, FIG. 4, a process is set up to permit user entry of scripts defining actions supplementing selected error messages. These actions may just be additional information to augment the displayed error message or they may also involve modifications in the detected error handling procedures. This is carried out by the user input 19 to the library of error message supplementary scripts 15, FIG. 3. Next, a facility, section 23 of database 20 is set up to store such scripts, step 84, FIG. 4. A process is set up to carry out the scripted actions in response to the appropriate error messages and a process is set up to get the stored scripts from database section 23 and to supplement the displayed error messages with information relative to supplementary actions based on such scripts, step 85, FIG. 4. This completes the set up for the programming process.

Now, with respect to FIG. 5, there will be described a simple process for determining which of the basic error messages accompanying a program to be executed in the system require either modification of error handling or supplementary data to augment the basic set of error messages. First, step 91, the user or the operator providing system support reviews the library of basic error conditions, as well as any actions and error messages provided by the program. This is the Library 13, FIG. 3. With each condition and its representative error message, a determination is made, step 92, as to whether a modifying action is required in response to the appearance of the error message. If Yes, then the script is stored, step 93 and a library routine is set up in library 15 of FIG. 3. If the determination from step 92 is No, then a decision is made, step 94 as to whether the operator feels that the error messages require more displayed data to advise the user. If Yes, this script is also stored and a library routine is set up, step 95, in the supplemental library 15, FIG. 3. If the decision from step 94 is No or after either step 93 or 95, a decision is made, step 96, as to whether the last basic error message for the program being executed has been reviewed. If No, then the flow is returned to step 92 and the next error condition/error message is reviewed and the process continued as described. If the decision from step 96 is yes, the program is over and is exited.

The running of the process with respect to error conditions in a program being operated will now be described with respect to FIG. 6. First, the running of the program is commenced, step 101. Then a decision is made, step 102, as to whether there is an initial or next error condition. If Yes, then, step 104, the basic error message for that condition is gotten through library 13, FIG. 3, and that error message is stored for display, step 105. Next, a determination is made, step 106, as to whether there is any script listed in supplementary library 15, FIG. 3. If Yes, the script is retrieved and executed, step 107, and, then, step 109, the supplementary data to be displayed is displayed along with the stored error message. On the other hand, if the decision from step 106 is No, then just the basic error message is displayed. At this point, or if the decision from step 102 was that there was no next error condition, the flow proceeds to step 103 where a decision is made as to whether the end of the program being executed has been reached. If Yes, the program is exited. If No, then the flow is returned to step 101, and the program continues to be run as described above.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer managed data processing operations system, an enhanced error message system comprising:

means for basic detecting and handling of a basic set of error conditions, means for providing error messages relative to said detecting and handling means, means for providing dynamic modifications in the basic handling of said error conditions during said operations, means for recording data representative of said dynamic modifications, means responsive to said error messages for activating said dynamic modification means, and means responsive to said activating means for searching said recorded data and augmenting said error messages with additional information relative to said modifications.

2. In computer managed communication network operations with user interactive access via a plurality of display terminals, an enhanced error message system comprising:

means for basic detecting and handling of a basic set of error conditions, means for providing on at least one of said display terminals, error messages relative to said detecting and handling means, means for providing dynamic modifications in the basic handling of said error conditions during said operations, means for recording data representative of said dynamic modifications, means responsive to said error messages for activating said dynamic modification means, and means responsive to said activating means for searching said recorded data and augmenting said error messages with additional information relative to said modifications.

3. The computer managed network of claim 2 wherein said modifications are recorded in a scripted programming language.

4. The computer managed network of claim 3 wherein said scripted programming language is Perl.

5. In a computer managed data processing operations system, a method of providing enhanced error messages comprising:

detecting and handling of a basic set of error conditions, providing error messages relative to said detecting and handling means, enabling dynamic modifications in the basic handling of said error conditions during said operations, recording data representative of said dynamic modifications, activating said dynamic modifications responsive to said error messages, and searching said recorded data responsive to said activating of modifications and augmenting said error messages with additional information relative to said modifications.

6. In computer managed communication network operations with user interactive access via a plurality of display terminals, a method of providing enhanced error messages comprising:

detecting and handling of a basic set of error conditions, providing on at least one of said display terminals, error messages relative to said error conditions, enabling dynamic modifications in the basic handling of said error conditions during said operations, recording data representative of said dynamic modifications, activating said dynamic modification means responsive to said error messages, and searching said recorded data responsive to said activating of modifications and augmenting said error messages with additional information relative to said modifications.

7. The method of claim 6 wherein said modifications are recorded in a scripted programming language.

8. The method of claim 7 wherein said scripted programming language is Perl.

9. A computer program having program code included on a computer readable medium for providing enhanced error messages for computer managed data processing operations comprising:

means for basic detecting and handling of a basic set of error conditions, means for providing a set of basic error messages respectively responsive to said basic set of error conditions including a library of routines for converting each of said set of basic error conditions respectively into a corresponding error message, means for recording data augmenting said basic error messages, and means responsive to the occurrence of an error message for searching for said recorded data and augmenting the error message with said recorded data.

10. The computer program of claim 9 wherein said recorded data is recorded in a scripted programming language.

11. A computer program having program code included on a computer readable medium for providing enhanced error messages for computer managed data processing operations comprising:

means for basic detecting and handling of a basic set of error conditions, means for providing error messages relative to said detecting and handling means, means for providing dynamic modifications in the basic handling of said error conditions during said operations, means for recording data representative of said dynamic modifications, means responsive to said error messages for activating said dynamic modification means, and means responsive to said activating means for searching said recorded data and augmenting said error messages with additional information relative to said modifications.

12. A computer program having program code included on a computer readable medium for providing enhanced error messages for computer managed communication network operations with user interactive access via a plurality of display terminals, said program comprising:

means for basic detecting and handling of a basic set of error conditions, means for providing on at least one of said display terminals, error messages relative to said detecting and handling means, means for providing dynamic modifications in the basic handling of said error conditions during said operations, means for recording data representative of said dynamic modifications, means responsive to said error messages for activating said dynamic modification means, and means responsive to said activating means for searching said recorded data and augmenting said error messages with additional information relative to said modifications.

13. The computer program of claim 12 wherein said modifications are recorded in a scripted programming language.

14. The computer program of claim 13 wherein said scripted programming language is Perl.

15. In a computer managed data processing operations system, an enhanced error message system comprising:

means for basic detecting and handling of a basic set of error conditions, means responsive to said basic set of error conditions for providing a set of basic error messages including a library of routines for converting each of said set of basic error conditions respectively into a corresponding error message, means for recording data in a scripted programming language augmenting said basic error messages, and means responsive to the occurrence of an error message for searching for said recorded data and augmenting the error message with said recorded data.

16. In computer managed communication network operations with user interactive access via a plurality of display terminals, an enhanced error message system comprising:

means for basic detecting and handling of a basic set of error conditions, means for providing on at least one of said display terminals, error messages including a library of routines for converting each of said set of basic error conditions respectively into a corresponding error message relative to said detecting and handling means, means for providing dynamic modifications in the basic handling of said error conditions during said operations, means for recording data representative of said dynamic modifications, means responsive to said error messages for activating said dynamic modification means, and means responsive to said activating means for searching said recorded data and augmenting said error messages with additional information relative to said modifications.

17. In computer managed data processing operations system, a method of providing enhanced error messages comprising:

detecting and handling a basic set of error conditions, providing a set of basic error messages respectively responsive to said basic set of error conditions including a library of routines for converting each of said set of basic error conditions respectively into a corresponding error message, recording, in a scripted programming language, data augmenting said basic error messages, and searching for said recorded data responsive to the occurrence of an error message and augmenting the error message with said recorded data.

18. In computer managed communication network operations with user interactive access via a plurality of display terminals, a method of providing enhanced error messages comprising:

detecting and handling of a basic set of error conditions, providing on at least one of said display terminals, error messages relative to said error conditions including using a library of routines for converting each of said set of basic error conditions respectively into a corresponding error message, enabling dynamic modifications in the basic handling of said error conditions during said operations, recording in a scripted programming language data representative of said dynamic modifications, activating said dynamic modification means responsive to said error messages, and searching said recorded data responsive to said activating of modifications and augmenting said error messages with additional information relative to said modifications.

19. A computer program having program code included on a computer readable medium for providing enhanced error messages for computer managed communication network operations with user interactive access via a plurality of display terminals, said program comprising:

means for basic detecting and handling of a basic set of error conditions, means for providing on at least one of said display terminals, error messages including a library of routines for converting each of said set of basic error conditions respectively into a corresponding error message relative to said detecting and handling means, means for providing dynamic modifications in the basic handling of said error conditions during said operations, means for recording data representative of said dynamic modifications, means responsive to said error messages for activating said dynamic modification means, and means responsive to said activating means for searching said recorded data and augmenting said error messages with additional information relative to said modifications.

* * * * *